United States Patent
Nahler et al.

(10) Patent No.: US 11,962,915 B2
(45) Date of Patent: Apr. 16, 2024

(54) METHOD AND IMAGING SYSTEM FOR GENERATING A GRAY-SCALE IMAGE

(71) Applicant: Infineon Technologies AG, Neubiberg (DE)

(72) Inventors: Caterina Nahler, Thondorf (AT); Hannes Plank, Graz (AT); Armin Josef Schoenlieb, Seiersberg-Pirka (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 17/692,843

(22) Filed: Mar. 11, 2022

(65) Prior Publication Data
US 2022/0294966 A1    Sep. 15, 2022

(30) Foreign Application Priority Data
Mar. 12, 2021   (EP) ..................... 21162277

(51) Int. Cl.
| | | |
|---|---|---|
| *H04N 23/74* | (2023.01) | |
| *G01S 7/487* | (2006.01) | |
| *G01S 17/894* | (2020.01) | |
| *G03B 15/05* | (2021.01) | |
| *H04N 23/56* | (2023.01) | |

(52) U.S. Cl.
CPC ........... *H04N 23/74* (2023.01); *G01S 7/4873* (2013.01); *G01S 17/894* (2020.01); *G03B 15/05* (2013.01); *H04N 23/56* (2023.01)

(58) Field of Classification Search
CPC ........ H04N 23/74; H04N 23/56; H04N 25/59; H04N 25/705; H04N 25/587; H04N 25/771; G01S 7/4873; G01S 17/894; G03B 15/05; G06T 11/00; G06T 1/0007; G06T 2207/10004; G06T 2207/10152
See application file for complete search history.

(56) References Cited

U.S. PATENT DOCUMENTS

| | | |
|---|---|---|
| 9,860,461 B2 | 1/2018 | Feder et al. |
| 11,348,269 B1 * | 5/2022 | Ebrahimi Afrouzi .. G06V 20/56 |

(Continued)

FOREIGN PATENT DOCUMENTS

EP    3550329 A1    10/2019

*Primary Examiner* — Nasim N Nirjhar
(74) *Attorney, Agent, or Firm* — Murphy, Bilak & Homiller, PLLC (57) ABSTRACT

An imaging system includes an illumination element for emitting light and an imaging sensor having at least one photo-sensitive element that includes a first element with a modifiable first charge level and a second element with a modifiable second charge level. Control circuitry is configured to, during a first phase, control the illumination element to emit light towards a scene and drive the photo-sensitive element such that charge carriers generated in the photo-sensitive element by light received from the scene modify the first charge level. The control circuitry is configured to, during a second phase, control the illumination element to pause emission of the light and drive the photo-sensitive element such that charge carriers generated in the photo-sensitive element by light received modify the second charge level, and to generate a gray-scale image of the scene based on the first and second charge levels.

13 Claims, 4 Drawing Sheets (56) References Cited

U.S. PATENT DOCUMENTS

| | | | |
|---|---|---|---|
| 2022/0104691 A1* | 4/2022 | Sato | H04N 23/45 |
| 2022/0146921 A1* | 5/2022 | Yu | H04N 9/3161 |
| 2022/0210353 A1* | 6/2022 | Velichko | H04N 25/771 |
| 2022/0230455 A1* | 7/2022 | Popovic | G06V 20/59 |
| 2022/0303479 A1* | 9/2022 | Danan | G01S 17/89 |

* cited by examiner

METHOD AND IMAGING SYSTEM FOR GENERATING A GRAY-SCALE IMAGE

TECHNICAL FIELD

Examples relate to a method for generating a gray-scale image using an imaging system and to a corresponding imaging system.

BACKGROUND

Even though Time-of-Flight (ToF) cameras are primarily used for 3D sensing, a 2D image (each pixel containing the amount of reflected light), has value on its own. For example, texture information that is not contained in the depth estimate anymore may be derived from the 2D image. For example, this 2D image can be provided by calculating the amplitude of the continuous wave-modulated raw images. However, 2D images that are based on the amplitude of the continuous wave-modulated raw images may have motion artefacts and may suffer from wiggling error.

In some cases, a gray-scale image can be generated and used to substitute the amplitude image, with the grayscale image being advantageous with regards to motion artifacts and wiggling error. However, when gray-scale images are generated instead of amplitude images, the background light may impair the measurement. In some cases, the environmental background light can be removed from the gray image through the subtraction of an additional frame in which the infrared (IR) illumination unit of the camera is inactive. Although the additional frame does not require energy for laser operation, the additional readout requires more energy and time.

There may be a desire for an improved concept for generating a two-dimensional image using an imaging system, such as a ToF imaging system.

SUMMARY

This desire is addressed by the embodiments described herein.

Various examples relate to a method for generating a gray-scale image using an imaging system. The imaging system comprises an illumination element for emitting light and an imaging sensor comprising at least one photo-sensitive element. Each photo-sensitive element comprises a first element with a modifiable first charge level and a second element with a modifiable second charge level. The method comprises, during a first phase, controlling the illumination element to emit light towards a scene and driving the at least one photo-sensitive element such that charge carriers generated in the at least one photo-sensitive element by light received from the scene modify the first charge level. The method comprises, during a second phase, controlling the illumination element to pause emission of the light and driving the at least one photo-sensitive element such that charge carriers generated in the at least one photo-sensitive element by light received modify the second charge level. The method comprises generating the gray-scale image of the scene based on the first charge level and the second charge level.

Various examples relate to an imaging system. The imaging system comprises an illumination element for emitting light. The imaging system comprises an imaging sensor comprising at least one photo-sensitive element. Each photo-sensitive element comprises a first element with a modifiable first charge level and a second element with a modifiable second charge level. The imaging system comprises control circuitry, configured to, during a first phase, control the illumination element to emit light towards a scene and drive the at least one photo-sensitive element such that charge carriers generated in the at least one photo-sensitive element by light received from the scene modify the first charge level. The control circuitry is configured to, during a second phase, control the illumination element to pause emission of the light and drive the at least one photo-sensitive element such that charge carriers generated in the at least one photo-sensitive element by light received modify the second charge level. The control circuitry is configured to generate a gray-scale image of the scene based on the first charge level and the second charge level.

BRIEF DESCRIPTION OF THE FIGURES

Some examples of apparatuses and/or methods will be described in the following by way of example only, and with reference to the accompanying figures, in which.

DETAILED DESCRIPTION

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an 'or', this is to be understood as disclosing all possible combinations, i.e., only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

Various examples of the present disclosure relate to a concept for generating a gray-scale image using an imaging system.

Figure 1A:
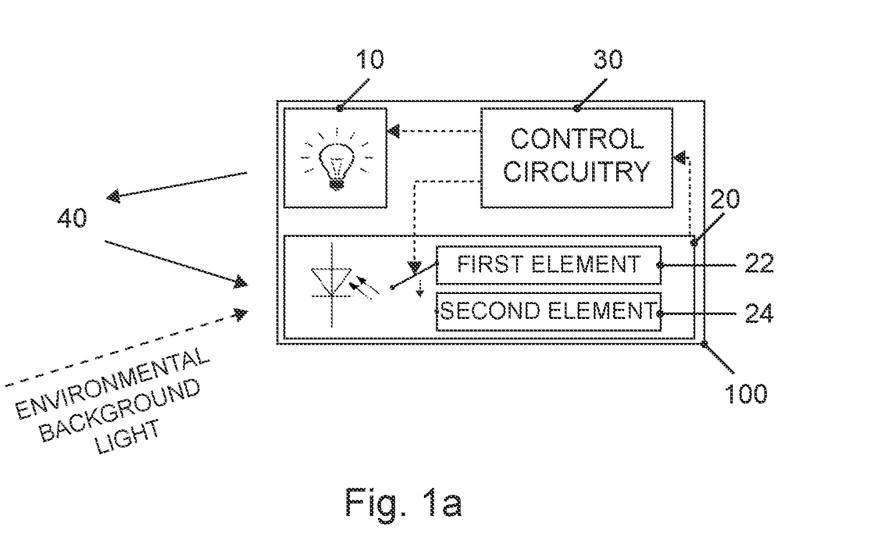
FIG. 1a shows a schematic diagram of an imaging system according to an example.

FIG. 1a shows a schematic diagram of an imaging system 100 according to an example.

The imaging system 100 comprises an illumination element 10 for emitting light. The illumination element 10 may comprise any number of light sources. The illumination element 10 may, for example, comprise one or more Light-Emitting Diodes (LEDs) and/or one or more laser diodes (e.g., one or more Vertical-Cavity Surface-Emitting Lasers, VCSELs) which are fired as controlled by the proposed method and/or the control circuitry 30.

The imaging system further comprises an imaging sensor 20 comprising at least one photo-sensitive element. For example, the (or each) photo-sensitive element may be an element that is sensitive to light, to sense the light that is incident to the photo-sensitive element. In various examples, the imaging sensor may comprise a plurality of photo-sensitive elements, e.g., a two-dimensional array of photo-sensitive elements. For example, the photo-sensitive elements of the two-dimensional array of photo-sensitive elements may also be denoted "pixels" of the imaging sensor.

The (or each) photo-sensitive element 20 comprises a first element 22 with a modifiable first charge level and a second element 24 with a modifiable second charge level. The first element 22 and the second element 24 form logical buckets for the photo-sensitive element 20. For instance, the first and second element 22, 24 are implemented using capacitors. When light is received by a photo-sensitive element 20, a charge carrier is generated. Depending on a state of a control signal (also called "reference signal") being used to drive the photo-sensitive element 20, the charge carrier is directed towards one of the two or more elements 22; 24 and modifies the corresponding charge level. For example, the charges may be collected in the elements 22; 24 and integrated to determine the charge levels of the elements.

In the following, the concept is primarily described with respect to two elements with modifiable charge levels. In some examples, however, each photo-sensitive element may comprise more than two elements with modifiable charge levels, e.g., four elements with modifiable charge levels. In general, each photo-sensitive element may comprise an arbitrary number (greater than one) of such elements with modifiable charge levels.

In general, photo-sensitive elements comprising (at least) two elements with modifiable charge levels can be found in Time-of-Flight sensors. For example, the imaging system 100 may be a Time-of-Flight imaging system or Time-of-Flight sensor. The imaging sensor 20 may be a photonic mixer device (PMD) of the Time-of-Flight imaging system or Time-of-Flight sensor. In Time-of-Flight sensors, the two elements 22; 24 with modifiable charge levels are used to separately collect charges generated based on light received from a scene in different phase windows. When a Time-of-Flight measurement is performed, the charges that are based on light received in different phase windows are integrated separately, and used to determine a phase-delay that is indicative of a distance between the Time-of-Flight sensor and the scene. During Time-of-Flight operation of the Time-of-Flight sensor, environmental background light is reduced/removed from the correlated raw frames, as one of the charge levels in which the Time-of-Flight sensor integrates the charges during exposure is subtracted from the other.

Alternatively, the imaging system 100 might not be a Time-of-Flight camera, but a camera with a 2D image sensor with two switchable charge storage elements (per pixel). For example, the imaging sensor 100 may be a Charge-Coupled Device (CCD) based imaging sensor. In CCD-based imaging sensors, incoming light (i.e., photons) are converted into charges at a semiconductor-oxide interface, which are subsequently moved between elements with modifiable charge levels (denoted "capacitive bins") within the imaging sensor. For example, the two elements 22; 24 with modifiable charge levels may be capacitive bins of a CCD-based imaging sensor.

The imaging system 100 of FIG. 1a further comprises control circuitry 30, which is coupled to the illumination element 10 and the imaging sensor 20, and which is and used to control and/or drive the illumination element 10 and the imaging sensor 20. In general, the control circuitry may be configured to perform the method shown in connection with FIGS. 1b and 1c, therefore, the functionality of the control circuitry is shown with reference to the method of FIGS. 1b and 1c.

Figure 1B:
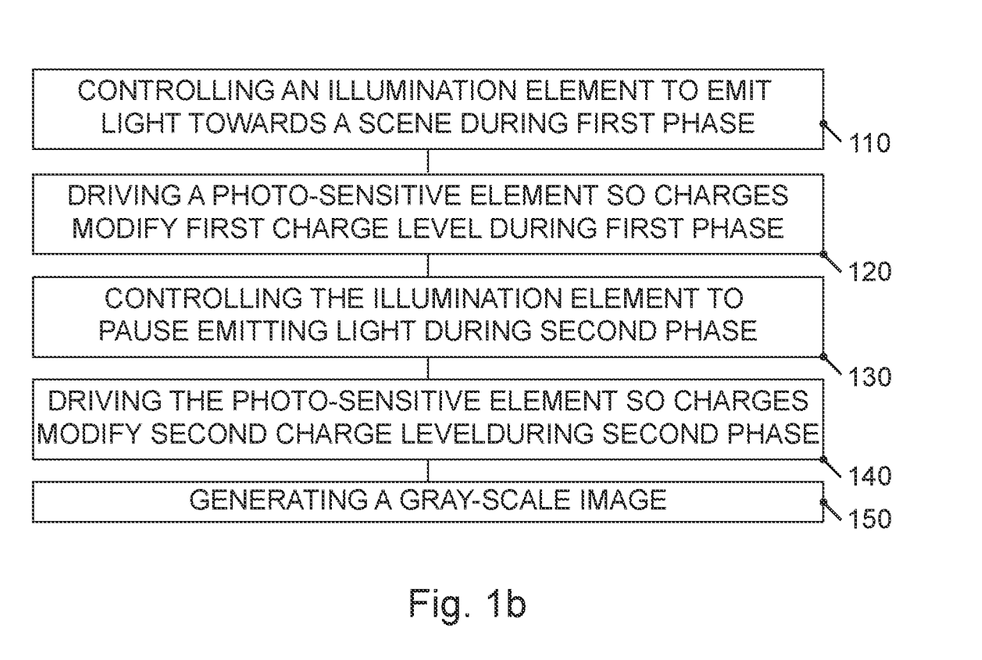
FIGS. 1b and 1c show flow charts of a method for generating a gray-scale image using an imaging system according to various examples.
Figure 1C:
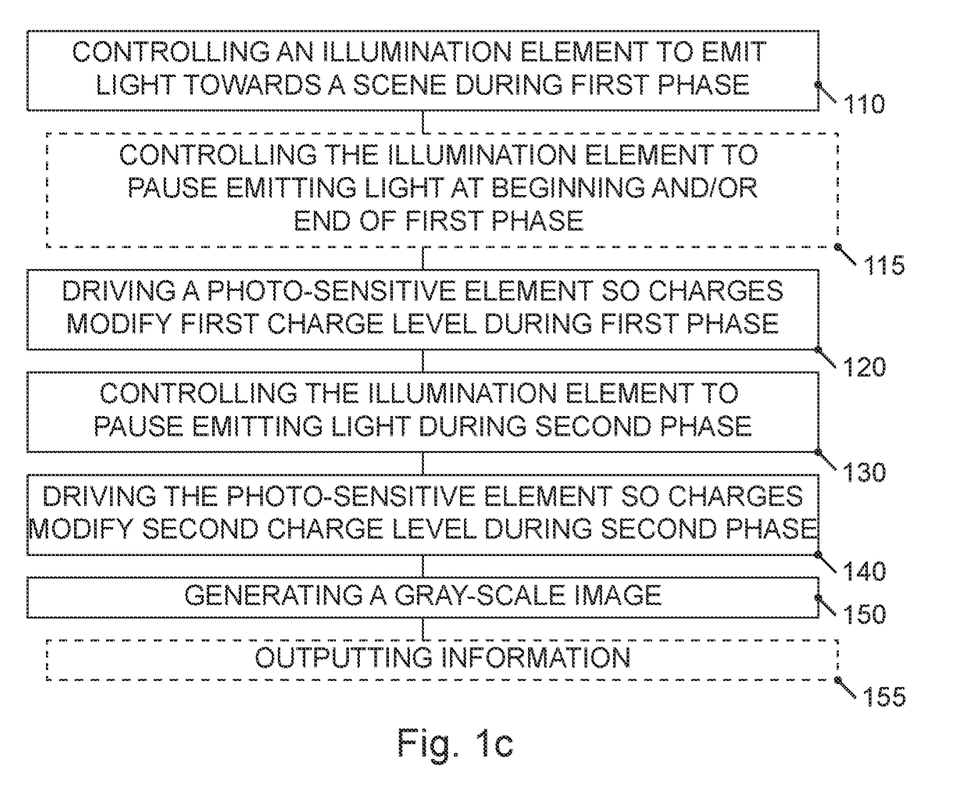

FIGS. 1b and 1c show flow charts of a method for generating a gray-scale image using an imaging system, such as the imaging system 100 of FIG. 1a, according to various examples. The following description thus relates to the method introduced in connection with FIGS. 1b and/or 1c and to the imaging system 100 of FIG. 1a. Features introduced in connection with the method may likewise be applied to the imaging system, and vice versa.

In general, the method and imaging system operate in two phases, a first phase and a second phase. In general, the imaging system may alternate between the phases, e.g., to perform the phases alternatingly. For example, the imaging system may alternate between the first and second phase, with each phase having (substantially) the same duration. For example, the first phase and the second phase may be time-intervals, during which the illumination system and the at least one photo-sensitive element are controlled according to a pre-defined set of instructions. For example, during the first phase, the illumination system and the at least one photo-sensitive element may be controlled according to a first pre-defined set of instructions, and during the first phase, the illumination system and the at least one photo-sensitive element may be controlled according to a second pre-defined set of instructions. In other words, the illumination system and the at least one photo-sensitive elements are controlled differently, depending on the phase the imaging system is operating in.

As shown in FIGS. 1b and 1c, the method comprises, during the first phase, controlling 110 the illumination element to emit light towards a scene 40 (as shown in FIG. 1a) and driving 120 the at least one photo-sensitive element such that charge carriers generated in the at least one photo-sensitive element by light received from the scene modify the first charge level. The method comprises, during the second phase, controlling 130 the illumination element to pause emission of the light and driving 140 the at least one photo-sensitive element such that charge carriers generated in the at least one photo-sensitive element by light received modify the second charge level. In FIGS. 2 to 5, the extent of the first phase and of the second phase can be seen from the respective sensor reference signals 220; 530; 540; 550—"A", which denotes the first element, is active during the entire first phase, and "B", which denotes the second element, is active during the entire second phase. For example, the imaging system may be driven to alternate between directing the charge carriers generated in the at least one photo-sensitive element to the first element (i.e., the first phase) and directing the charge carriers generated in the at least one photo-sensitive element to the second element (i.e., the second phase).

Figure 5:
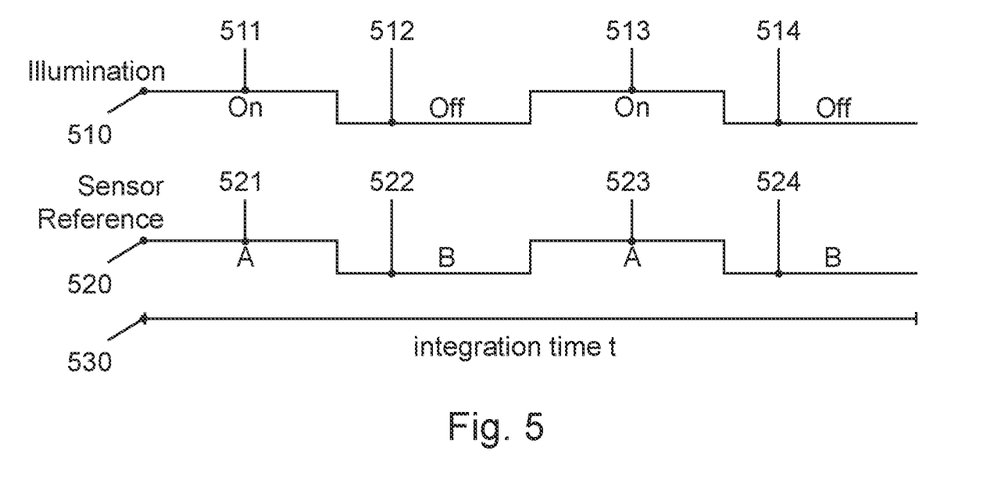

The method further comprises generating 150 the gray-scale image of the scene based on the first charge level and the second charge level. In general, the time-interval being used for collecting the charges that are used to generate the gray-scale image is called "integration time". In other words, the grey-scale image is generated based on the charge carriers that are collected during the integration time. In some examples, the integration time may comprise the first phase and the second phase, i.e., a single first phase and a single second phase. Alternatively, the gray-scale image may be generated over the course of a sequence of alternating first and second phases. In other words, the integration time may comprise a sequence of alternating first and second phases, e.g., two or more first phases and two or more second phases. For example, during the integration time of the gray-scale image, a first phase may be followed by a second phase, which may be followed by another first phase, which may be followed by another second phase (as shown in FIG. 5, for example).

In various examples, as shown in FIGS. 2 to 5, the first phase occurs before the second phase, i.e., the phase during which light is emitted occurs before the phase during which the light emissions are paused. In some examples, however, contrary to nomenclature, the first phase may occur before the second phase. For example, the integration time may be composed of a second phase that is followed by a first phase, or of a second phase followed by a first phase, which is followed by another second phase that is followed by another first phase.

Thus, the (at least) two elements with modifiable charge levels are used to separately collect charges that are generated based on light received in one of the two phases. The first element of each photo-sensitive element is used to collect charges (only) of light received during the first phase, and the second element of each photo-sensitive element is used to collect charges (only) of light received during the second phase. In other words, during the first phase, the at least one photo-sensitive element is driven such that charge carriers generated in the at least one photo-sensitive element modify the first charge level, and during the second phase the at least one photo-sensitive element is driven such that charge carriers generated in the at least one photo-sensitive element modify the second charge level. For example, during the first phase, the charges generated in the at least one photo-sensitive element by the light received from the scene may (only) be collected by the first element. During the second phase, the charges generated in the at least one photo-sensitive element by the light received may (only) be collected by the second element.

Similarly, the proposed concept may be adapted to the number of elements with modifiable charge levels. For example, if four elements with modifiable charge levels are used, four phases may be used, with each of the elements with modifiable charge levels being used to collect charges in (exactly) one of the phases. For example, the imaging system may alternate between the first, second, third and fourth phase, with each phase having (substantially) the same duration. Alternatively, two phases may be used, and two of the elements with modifiable charge levels may remain unused, or the charges generated within each of the two phases may be equally directed to two of the elements with modifiable charge levels.

The two (or four) phases differ with respect to the illumination being emitted by the illumination element. During the first phase, the illumination element is controlled to emit light towards the scene, and during the second phase, the illumination element is controlled to pause emission of the light. For example, the illumination element might only be active during the first phase and paused during the (entire) second phase. Consequently, the light received during the first phase may comprise a reflection of the light that is emitted during the first phase. During the second phase, the illumination is paused, so the light that is received might (only) comprise environmental background light (in addition to noise, such as photon shot noise). In other words, the light received by the imaging sensor during the first phase may comprise a reflection of the light emitted by the illumination element and environmental background light. The light received by the imaging sensor during the second phase might comprise (only) environmental background light. For example, during the second phase, no reflections, or substantially fewer reflections, of the light emitted by the illumination element might be received. For example, the environmental background light may be light that is not based on the light emitted by the illumination element, e.g., light that is based on the emission of one or more further (natural or artificial) light sources not connected to the imaging system.

Figure 2:
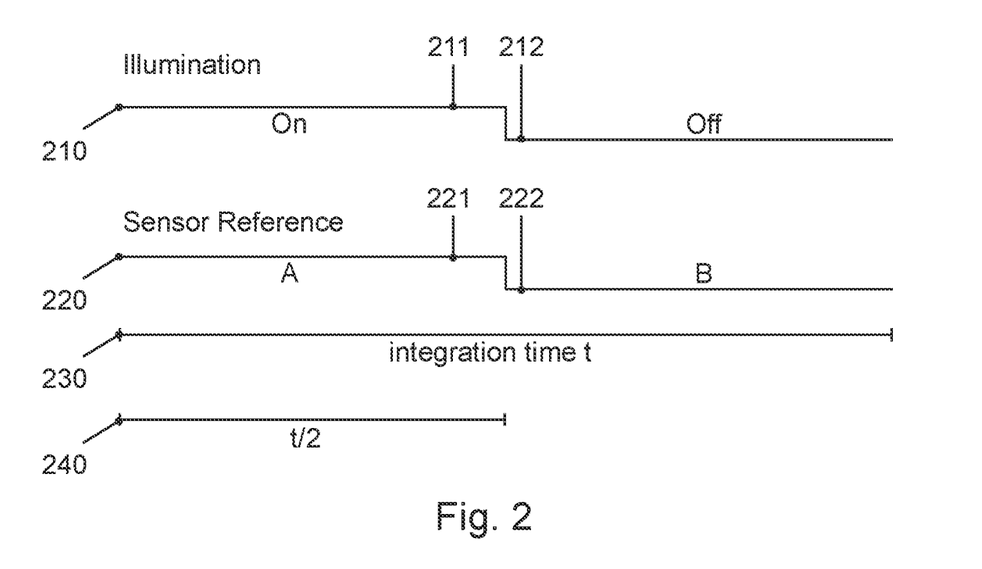
FIGS. 2 to 5 show state diagrams of examples of signals being used to control an illumination element and to drive at least one photo-sensitive element.

FIGS. 2 to 5 show state diagrams of examples of signals being used to control an illumination element and to drive at least one photo-sensitive element. FIG. 2 shows an illustration of the basic measurement principle for generating the gray-scale image. In FIG. 2, four rows 210-240 are shown. The first row 210 shows the activation state of the illumination element. In the first phase 211, the illumination is on, in the second phase 212, the illumination is off. The second row 220 shows which of the first and second element with modifiable charge levels is activated. In FIGS. 2 to 5, "A" denotes the first element, and "B" denotes the second element. In the first phase 221, the sensor reference signal drives the at least one photo-sensitive element such that charges generated based on light received from the scene modify the first charge level, and are thus collected by the first element. In the second phase 222, the sensor reference signal drives the at least one photo-sensitive element such that charges generated based on light received modify the second charge level, and are thus collected by the second element.

To measure an environmental background light corrected gray-scale image, the imaging system integrate the charges collected in the first element and second element (e.g., in the "A" bucket and "B" bucket) for the same amount of time. For example, the first phase and the second phase may have (substantially) the same duration. For example, the duration of the first phase may be at most 5% (of the duration of the first phase) longer or shorter than the duration of the second phase. The third row 230 shows the integration time t, and the fourth row 240 shows half the integration time (t/2). As is evident from FIG. 2, the duration of each of the phases may be half (i.e., t/2) of the total integration time t.

During integration, the (active) illumination of the imaging system is only active while the reflected light is integrated into only one of the buckets, for example. In FIGS. 2 to 5, this bucket is bucket A. In other words, the reflected light is collected and/or integrated only in bucket "A" (i.e., the first element). Therefore, the response stored in bucket A depends on the active illumination plus the environmental background light, while the response in B only depends on the environmental background light (plus noise in both buckets). The environmental background light response stored in A and B may be the same, as the time interval being used to collect/integrate charges in the respective buckets the same. Consequently, the gray image may be measured by integrating (close to) all the reflections from the scene of the active IR illumination into bucket A while the background light is integrated to equal parts into A and B. A subtraction operation of A minus B may therefore correct this influence. Compared to an approach in which images taken in two subsequent integration intervals, the proposed approach removes the need for an intermediate readout while sampling the environmental background light interference, which saves power and time, and avoids motion artifacts caused by motion between the gray-scale image and the background-light image.

However, due to signal jitter of the control signals being used to control the illumination element and drive the at least one photo-sensitive element, and due to the time the emitted light takes to reach the scene and be reflected back, some of the light emitted by the illumination element during the first phase may "spill over" into the second phase, and reflections of the light emitted in the first phase may generate charges that are collected in the second phase. For example, due to signal jitter, the respective phases of the illumination element and of the imaging sensor might not correspond precisely. For example, the respective phases, as applied at the illumination element and the imaging sensor, may overlap for at least 95% (or at least 98%, or at least 99%) of the duration of the respective phase (of the illumination element or of the imaging sensor).

In some examples, the illumination provided by the illumination element may be adapted to account for the signal jitter and the time it takes the light to be reflected back from the scene. For example, the duration during which light is emitted by the illumination element may be selected so that the reception of reflections of the emitted light by the photo-sensitive element is limited to the first phase among the first phase and the second phase. For example, the duration during which light is emitted may be shortened to make sure that reflections of the emitted light do not "spill over" (resulting in the corresponding charges being collected by the second element). For example, a safety margin may be included to ensure that illumination is turned off in time so that all active light (in flight) is returned from the scene to the sensor before the integration bucket is switched from the first element ("A") to the second element ("B").

Figure 3:
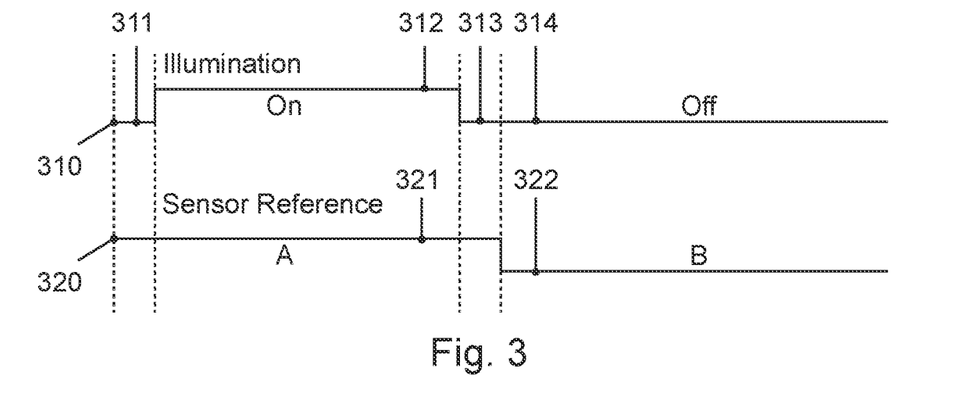
Figure 4:
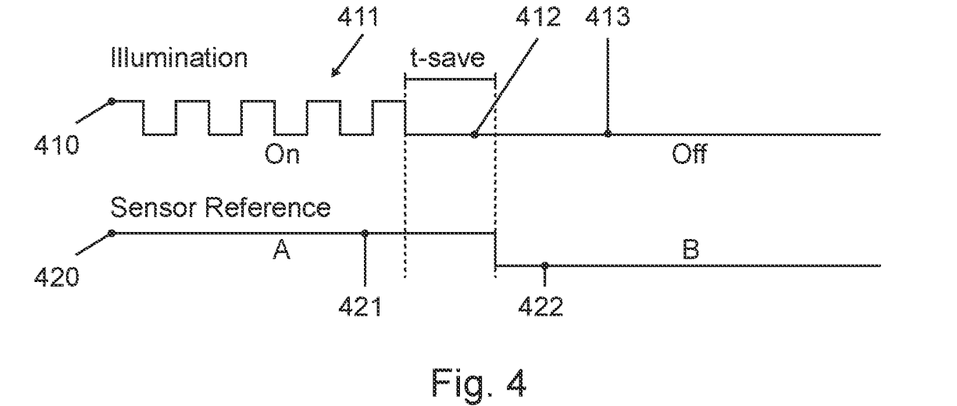

FIG. 3 shows an example, in which the illumination is controlled such that safety margins are included at the start and the end of the first phase. FIG. 3 shows two rows 310-320. The first row 310 shows the activation state of the illumination element, and the second row 320 shows which of the first and second element with modifiable charge levels is activated. In FIG. 3, the first phase (of the illumination element) comprises three portions 311-313. In the first portion 311, the illumination is switched off, in the second portion 312, which is the main portion of the first phase, the illumination is switched on, and in the third portion 313, the illumination is switched off again. The portions 311/313 at the beginning and end of the first phase act as safety margins, to avoid light being emitted by the illumination element leading to charge carriers being collected in the second element (bucket "B"). For example, the method may comprise controlling 115 the illumination element to further pause the emission of light at the beginning and/or at the end of the first phase. In other words, the illumination may, in addition to the entire second phase, further be paused at the beginning and/or at the end of the first phase. For example, at the beginning and/or end of the first phase, the emission of light may be paused during a safety margin located at the beginning or end of the first phase. In this case, the illumination is not provided over the entire course of the first phase. For example, due to pausing the illumination at the beginning and/or end of the first phase, the light might only be emitted during a time interval (e.g., portion 312 shown in FIG. 3) that is shorter than the first phase. For example, a time interval between a start of a first light pulse being emitted in the first phase and an end of a last light pulse being emitted during the first phase may cover at most 95% (or at most 90%) of the first phase. In other words, a duration of the time interval during which light is emitted may be less than 95% (or at most 90%) of the duration of the first phase. On the other hand, a (cumulative) duration of the pause of the illumination at the beginning and/or end of the first phase may be at least 5% (or at least 10%) of the overall duration of the first phase. The same principle is also shown in FIG. 4, where a safety margin t-save 412 is introduced at the end of the first phase of the illumination element.

Contrary to the illumination element, at the imaging sensor, the entire duration of the first phase 321 is used to integrate charges using the first element. As can be seen in FIG. 3, during the first 311, second 312 and third portion 313 of the first phase of the illumination element, the charges are directed to the first element (bucket "A"). During the entire second phase 314; 324, the illumination is paused, and the charges are directed to the second element (bucked "B").

In some cases, however, the effects of potential spillover may be disregarded. In practice, in many cases, the influence of signal jitter and reflections that are received within the second phase may have little effect on the overall quality of the gray-scale image. Therefore, the light may be emitted over (substantially) the entire course of the first phase, e.g., over at least 95% (or at least 98%, or at least 99%) of the duration of the first phase. In other words, a time interval between a start of a first light pulse being emitted in the first phase and an end of a last light pulse being emitted during the first phase might cover at least 95% (or at least 98%, or at least 99%) of the first phase.

Apart from the timing of the illumination, there are various other aspects of the illumination that may be adapted in various examples. In general, the illumination element 10 generates and emits the light. For example, in Time-of-Flight imaging systems, infrared light is used to perform the depth measurements. The same light may also be used to generate the gray-scale image. For example, the emitted light may be infrared light. As infrared is beyond the visible light spectrum, infrared light emissions may be used without irritating subjects being recorded by the imaging system. Alternatively, white light illumination may be used, i.e., illumination across the visible light spectrum (e.g., in case the imaging system is a 3D scanner, which emits white light and records the reflections using an RGB (Red-Green-Blue) array).

In some examples, as shown in FIGS. 2, 3 and 5, the illumination element may be turned on continuously, emitting a single pulse of light. In other words, the light emitted by the illumination element during the first phase may be emitted as a single light pulse.

Alternatively, the active (infrared) illumination may be modulated, as shown in FIG. 4, e.g., to avoid laser safety violations. FIG. 4 shows an illustration of a special illumination behavior based on continuous wave modulation and a safety margin (t-save) to ensure that no active illumination is assigned to bucket B. FIG. 4 shows two rows 410-420. The first row 410 shows the activation state of the illumination element, and the second row 420 shows which of the first and second element with modifiable charge levels is activated.

In FIG. 4, the first phase (of the illumination element) comprises two portions 411-412. In the first portion 411, the modulated illumination is switched on (as indicated by the square-wave pattern shown). In the second portion 412, which is used as safety margin t-save, the illumination is switched off. In the second phase 413, the illumination remains switched off. Similar to FIGS. 2 and 3, the entire duration of the first phase 421 is used to integrate charges using the first element, and the entire duration of the second phase 422 is used to integrated charges using the second element.

In general, various types of modulation may be used. For example, the modulation may follow a continuous or random pattern. In other words, the illumination emitted by the illumination element may be modulated using continuous-wave modulation or modulated according to a random pattern. For example, light pulses may be used to generate the modulated illumination, in particular if the illumination element comprises a VCSEL. For example, the light emitted by the illumination element during the first phase may comprise a plurality of light pulses. When a VCSEL is being used, light pulses provide an efficient way of driving the VCSEL without too much peak optical power (with respect to laser safety). The proposed concept however may be used with various systems and illumination patterns.

In FIGS. 2, 3 and 5, the illumination system is shows as being continuously switched on. However, similar to FIG. 4, alternatively, the illumination used in FIGS. 2, 3 and 5 may be modulated.

As mentioned above, the gray-scale image is generated over the course of a time-interval denoted integration time, which may comprise (exactly) one or several first phases and (exactly) one or several second phases.

In some examples, the integration bucket is changed only once during the integration time, e.g., at t/2 as shown in FIG. 2. Consequently, the integration time may comprise a single first phase (i.e., the first phase) and a single second phase (i.e., the second phase). Accordingly, the gray-scale image may be generated based on only the light received in the first phase and the second phase.

Alternatively, the measurement principle introduced in connection with FIGS. 2 to 4 may be repeated several times during the full integration time, which may reduce or avoid motion artifacts. For example, the gray-scale image may be generated over the course of a sequence of alternating first and second phases. For example, the first phase and second phase may be repeated (alternatingly) during the integration time. Such an example is shown in FIG. 5. FIG. 5 shows three rows 510-530. The first row 510 shows the activation state of the illumination element, the second row 520 shows which of the first and second element with modifiable charge levels is activated, and the third row 530 shows the integration time. As shown, the pattern shown in connection with FIG. 2 is repeated in FIG. 5 within the integration time, such that the integration time comprises two first phases 511/521 and 513/523 and two second phases 512/522 and 514/524. For example, the gray-scale image may be generated based on the light received in two or more first phases and two or more second phases of the sequence of alternating first and second phases. For example, the gray-scale image may be generated based on the light received in two or more first phases and two or more second phases comprised in the integration time.

Once the measurement is performed, the gray-scale image is generated based on the first charge level and the second charge level. For example, the present method and imaging system may be used to generate a background light-corrected gray-scale image, i.e., a gray-scale image in which an influence of (environmental) background light has been removed or attenuated. For example, the method may comprise determining (e.g., measuring) the first charge level and the second charge level. Based on the determined first charge level and second charge level, the gray-scale image may be generated. For example, the method may comprise determining (e.g., calculating), based on the first and second charge of each photo-sensitive element, a combination of the first charge level and of the second charge level for each photo-sensitive element. For example, the method may comprise determining a difference between the first charge level and the second charge level for each photo-sensitive element. For example, the second charge level may be subtracted from the first charge level. The gray-scale image may be generated based on the combination of, e.g., based on the difference between, the first charge level and the second charge level.

For example, the gray-scale image may be a two-dimensional image comprising a plurality of pixels, e.g., a two-dimensional array of pixels. The pixels of the gray-scale image may correspond to a numerical representation of the combination of, e.g., the difference between, the first charge levels and the second charge levels of the photo-sensitive elements of the imaging system. Alternatively (or additionally), the different charge levels may be evaluated outside the imaging system. For example, the pixels of the gray-scale image may comprise (separate) numerical representations of the first charge levels and the second charge levels of the photo-sensitive elements of the imaging system.

As is evident, the gray-scale image may be represented in different ways—e.g., as a combination of the charge levels, with the charge levels being represented separately, or a combination thereof. For example, the method may comprise outputting 155 information on the first and second charge level. For example, the method may comprise outputting 155 information on a combination of the first charge level and the second charge level. In this representation, the charge levels are already combined in the imaging system, and output as a combination. Alternatively or additionally, the method may comprise outputting 155 information on the first charge level and information on the second charge level separately. This way, additional computations may be applied on the separate values outside the imaging system. In some cases, a middle way may be chosen, by outputting the combination and the second charge level, which may be used in post-processing to further augment the image. For example, the method may comprise outputting 155 information on a combination of the first charge level and the second charge level and information on the second charge level (e.g., without outputting information on the first charge level).

Various examples of the present disclosure thus provide a measurement principle for measuring a (Time-of-Flight) gray-scale image that might not include environmental background light influence and requires only one readout. Such gray-scale images may be used, for example, in Artificial Intelligence (AI) based applications, such as face-identification applications. Compared to amplitude images, gray-scale images may not require a wiggling calibration, which reduces the calibration costs. Compared to other approaches, where another background light image is subtracted, the proposed method may require one fewer pixel readout, which saves energy, and avoids motion artifacts. Furthermore, the proposed concept may be used in face-identification system in a two-dimensional infrared camera (e.g., without Time-of-Flight capabilities) with active illumination, since depth is often primarily used for anti-spoofing.

The aspects and features described in relation to a particular one of the previous examples may also be combined with one or more of the further examples to replace an identical or similar feature of that further example or to additionally introduce the features into the further example.

In general, the method introduced in connection with FIGS. 1b and/or 1c may be implemented as a computer program, which may be executed on a programmable hardware component. Accordingly, the control circuitry may be a programmable hardware component.

For example, the control circuitry 30 of FIG. 1c may be implemented using one or more processing units, one or more processing devices, any means for processing, such as a processor, a computer or a programmable hardware component being operable with accordingly adapted software. In other words, the described function of the control circuitry 30 may as well be implemented in software, which is then executed on one or more programmable hardware components. Such hardware components may comprise a general-purpose processor, a Digital Signal Processor (DSP), a micro-controller, etc. Alternatively, the control circuitry may be implemented as an application-specific circuitry.

Examples may further be or relate to a (computer) program including a program code to execute one or more of the above methods when the program is executed on a computer, processor or other programmable hardware component. Thus, steps, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

The examples as described herein may be summarized as follows:

Some examples relate to a method for generating a gray-scale image using an imaging system. The imaging system comprises an illumination element for emitting light and an imaging sensor comprising at least one photo-sensitive element. Each photo-sensitive element comprises a first element with a modifiable first charge level and a second element with a modifiable second charge level. The method comprises, during a first phase, controlling the illumination element to emit light towards a scene and driving the at least one photo-sensitive element such that charge carriers generated in the at least one photo-sensitive element by light received from the scene modify the first charge level. The method comprises, during a second phase, controlling the illumination element to pause emission of the light and driving the at least one photo-sensitive element such that charge carriers generated in the at least one photo-sensitive element by light received modify the second charge level. The method comprises generating the gray-scale image of the scene based on the first charge level and the second charge level.

In various examples, the light received by the imaging sensor during the first phase comprises a reflection of the light emitted by the illumination element and environmental background light, and wherein the light received by the imaging sensor during the second phase comprises environmental background light.

According to some examples, the duration during which light is emitted by the illumination element is selected so that the reception of reflections of the emitted light by the photo-sensitive element is limited to the first phase among the first phase and the second phase.

In some examples, the light emitted by the illumination element during the first phase comprises a plurality of light pulses.

In some examples, the light emitted by the illumination element during the first phase is emitted as a single light pulse.

In various examples, a time interval between a start of a first light pulse being emitted in the first phase and an end of a last light pulse being emitted during the first phase covers at least 95% of the first phase.

In various examples, the method comprises controlling the illumination element to further pause the emission of light at the beginning and/or at the end of the first phase.

For example, a time interval between a start of a first light pulse being emitted in the first phase and an end of a last light pulse being emitted during the first phase covers at most 90% of the first phase.

According to some examples, the gray-scale image is generated based on only the light received in the first phase and the second phase.

In some examples, the gray-scale image is generated over the course of a sequence of alternating first and second phases, wherein the gray-scale image is generated based on the light received in two or more first phases and two or more second phases of the sequence of alternating first and second phases.

In various examples, the imaging sensor is driven to alternate between directing the charge carriers generated in the at least one photo-sensitive element to the first element and directing the charge carriers generated in the at least one photo-sensitive element to the second element.

In some examples, the emitted light is infrared light.

According to various examples, the imaging system is a Time-of-Flight imaging system.

In some examples, the method comprises outputting information on the first charge level and information on the second charge level separately.

According to some examples, the method comprises outputting information on a combination of the first charge level and the second charge level.

In some examples, the method comprises outputting information on a combination of the first charge level and the second charge level and information on the second charge level.

Various examples of the present disclosure relate to an imaging system. The imaging system comprises an illumination element for emitting light. The imaging system comprises an imaging sensor comprising at least one photo-sensitive element. Each photo-sensitive element comprises a first element with a modifiable first charge level and a second element with a modifiable second charge level. The imaging system comprises control circuitry, configured to, during a first phase, control the illumination element to emit light towards a scene and drive the at least one photo-sensitive element such that charge carriers generated in the at least one photo-sensitive element by light received from the scene modify the first charge level, during a second phase, control the illumination element to pause emission of the light and drive the at least one photo-sensitive element such that charge carriers generated in the at least one photo-sensitive element by light received modify the second charge level, and generate a gray-scale image of the scene based on the first charge level and the second charge level.

Some examples relate to an apparatus for generating a gray-scale image using an imaging system. The imaging system comprises an illumination element for emitting light and an imaging sensor comprising at least one photo-sensitive element. Each photo-sensitive element comprises a first element with a modifiable first charge level and a second element with a modifiable second charge level. The apparatus comprises means for, during a first phase, controlling the illumination element to emit light towards a scene and driving the at least one photo-sensitive element such that charge carriers generated in the at least one photo-sensitive element by light received from the scene modify the first charge level. The apparatus comprises means for, during a second phase, controlling the illumination element to pause emission of the light and driving the at least one photo-sensitive element such that charge carriers generated in the at least one photo-sensitive element by light received modify the second charge level. The apparatus comprises means for generating the gray-scale image of the scene based on the first charge level and the second charge level.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for generating a gray-scale image using an imaging system, the imaging system comprising an illumination element configured to emit light and an imaging sensor comprising at least one photo-sensitive element, each photo-sensitive element comprising a first element with a modifiable first charge level and a second element with a modifiable second charge level, the method comprising:
   during a first phase, controlling the illumination element to emit light towards a scene and driving the at least one photo-sensitive element such that charge carriers generated in the at least one photo-sensitive element by light received from the scene modify the first charge level;
   during a second phase, controlling the illumination element to pause emission of the light and driving the at least one photo-sensitive element such that charge carriers generated in the at least one photo-sensitive element by light received modify the second charge level;
   generating the gray-scale image of the scene based on the first charge level and the second charge level; and
   controlling the illumination element to further pause the emission of light at the beginning and/or at the end of the first phase,
   wherein a time interval between a start of a first light pulse being emitted in the first phase and an end of a last light pulse being emitted during the first phase covers at most 90% of the first phase.

2. The method of claim 1, wherein the light received by the imaging sensor during the first phase comprises a reflection of the light emitted by the illumination element and environmental background light, and wherein the light received by the imaging sensor during the second phase comprises environmental background light.

3. The method of claim 1, wherein the duration during which light is emitted by the illumination element is selected so that the reception of reflections of the emitted light by the photo-sensitive element is limited to the first phase among the first phase and the second phase.

4. The method of claim 1, wherein the gray-scale image is generated based on only the light received in the first phase and the second phase.

5. The method of claim 1, wherein the gray-scale image is generated over the course of a sequence of alternating first and second phases, and wherein the gray-scale image is generated based on the light received in two or more first phases and two or more second phases of the sequence of alternating first and second phases.

6. The method of claim 1, wherein the imaging sensor is driven to alternate between directing the charge carriers generated in the at least one photo-sensitive element to the first element and directing the charge carriers generated in the at least one photo-sensitive element to the second element.

7. The method of claim 1, wherein the emitted light is infrared light.

8. The method of claim 1, wherein the imaging system is a Time-of-Flight imaging system.

9. The method of claim 1, further comprising outputting information on the first charge level of the first capacitor and information on the second charge level of the second capacitor separately.

10. The method of claim 1, further comprising outputting information on a combination of the first charge level of the first capacitor and the second charge level of the second capacitor.

11. The method of claim 1, further comprising outputting information on a combination of the first charge level of the first capacitor and the second charge level of the second capacitor and information on the second charge level of the second capacitor.

12. A method for generating a gray-scale image using an imaging system, the imaging system comprising an illumination element configured to emit light and an imaging sensor comprising at least one photo-sensitive element, each photo-sensitive element comprising a first element with a modifiable first charge level and a second element with a modifiable second charge level, the method comprising:
   during a first phase, controlling the illumination element to emit light towards a scene and driving the at least one photo-sensitive element such that charge carriers generated in the at least one photo-sensitive element by light received from the scene modify the first charge level;
   during a second phase, controlling the illumination element to pause emission of the light and driving the at least one photo-sensitive element such that charge carriers generated in the at least one photo-sensitive element by light received modify the second charge level; and
   generating the gray-scale image of the scene based on the first charge level and the second charge level,
   wherein the light emitted by the illumination element during the first phase comprises a plurality of light pulses,
   wherein a time interval between a start of a first light pulse being emitted in the first phase and an end of a last light pulse being emitted during the first phase covers at least 95% of the first phase.

13. A method for generating a gray-scale image using an imaging system, the imaging system comprising an illumination element configured to emit light and an imaging sensor comprising at least one photo-sensitive element, each photo-sensitive element comprising a first element with a modifiable first charge level and a second element with a modifiable second charge level, the method comprising:
   during a first phase, controlling the illumination element to emit light towards a scene and driving the at least one photo-sensitive element such that charge carriers generated in the at least one photo-sensitive element by light received from the scene modify the first charge level;
   during a second phase, controlling the illumination element to pause emission of the light and driving the at least one photo-sensitive element such that charge carriers generated in the at least one photo-sensitive element by light received modify the second charge level; and
   generating the gray-scale image of the scene based on the first charge level and the second charge level,
   wherein the light emitted by the illumination element during the first phase is emitted as a single light pulse,
   wherein a time interval between a start of a first light pulse being emitted in the first phase and an end of a last light pulse being emitted during the first phase covers at least 95% of the first phase.

\* \* \* \* \*